United States Patent
Kral et al.

(10) Patent No.: US 8,820,248 B2
(45) Date of Patent: Sep. 2, 2014

(54) CONTINUOUSLY VARIABLE DYNAMIC BRAKE FOR A LOCOMOTIVE

(75) Inventors: John Franklin Kral, Plainfield, IL (US); Sidarta Fornari Beltramin, Curitiba (BR)

(73) Assignee: Progress Rail Services Corp, Albertville, AL (US)

( * ) Notice: Subject to any disclaimer, the term of this patent is extended or adjusted under 35 U.S.C. 154(b) by 206 days.

(21) Appl. No.: 13/330,338

(22) Filed: Dec. 19, 2011

(65) Prior Publication Data

US 2013/0152816 A1 Jun. 20, 2013

(51) Int. Cl.
*B61C 3/00* (2006.01)

(52) U.S. Cl.
USPC .............................. 105/54; 105/55

(58) Field of Classification Search
USPC .............. 105/49, 54, 55, 56, 73–78; 318/112, 318/113, 380
See application file for complete search history.

(56) References Cited

U.S. PATENT DOCUMENTS

| | | | | |
|---|---|---|---|---|
| 4,008,423 A | * | 2/1977 | Christianson et al. | 318/139 |
| 4,195,254 A | * | 3/1980 | Gurwicz et al. | 388/804 |
| 5,245,495 A | * | 9/1993 | Bailey et al. | 361/23 |
| 5,323,095 A | * | 6/1994 | Kumar | 318/376 |
| 5,508,872 A | * | 4/1996 | Khoo et al. | 361/42 |
| 5,528,445 A | * | 6/1996 | Cooke et al. | 361/20 |
| 6,497,182 B2 | * | 12/2002 | Melpolder et al. | 105/73 |
| 7,344,202 B2 | * | 3/2008 | Linebach et al. | 303/113.2 |
| 7,562,945 B2 | * | 7/2009 | Linebach et al. | 303/113.2 |
| 2004/0162696 A1 | * | 8/2004 | Kumar | 702/132 |
| 2006/0255656 A1 | * | 11/2006 | Linebach et al. | 303/113.2 |
| 2009/0295315 A1 | * | 12/2009 | Tarnow et al. | 318/380 |
| 2013/0152817 A1 | * | 6/2013 | Kral et al. | 105/54 |

FOREIGN PATENT DOCUMENTS

| | | |
|---|---|---|
| DE | 19637713 | 3/1998 |
| EP | 0578366 | 1/1994 |
| EP | 1385261 | 1/2004 |
| WO | 2006020587 | 2/2006 |

* cited by examiner

*Primary Examiner* — Jason C Smith
(74) *Attorney, Agent, or Firm* — Finnegan, Henderson, Farabow, Garrett & Dunner LLP (57) ABSTRACT

This disclosure is directed to a traction motor drive system. The traction motor drive system may include a field winding subsystem comprising a field winding associated with a traction motor. The traction motor drive system may also include an armature subsystem arranged in parallel with the field winding subsystem. The armature subsystem may include an armature having first and second armature terminals and a grid resistor selectively electrically coupled in series with the armature. The armature subsystem may also include an armature chopper arranged in parallel with the grid resistor and electrically coupled in series with the armature. The armature chopper may be configured, when the grid resistor is electrically coupled to the armature, to conditionally conduct current to the armature.

8 Claims, 4 Drawing Sheets

CONTINUOUSLY VARIABLE DYNAMIC BRAKE FOR A LOCOMOTIVE

TECHNICAL FIELD

The present disclosure relates generally to traction motor drive systems, and more particularly, to systems and methods for dynamic braking on a locomotive.

BACKGROUND

During dynamic braking, traction motors may function as generators to slow the movement of the locomotive by converting the kinetic energy of the locomotive into electrical energy. In rheostatic dynamic braking, grid resistors can be incorporated to dissipate the generated energy as heat. As the locomotive slows, the current generation of the armature decreases. To allow dynamic braking to continue as current generation of the armature continues to decrease, the field current is increased towards the maximum rated current of the field windings. Once the maximum rating of the field current is reached, the equivalent resistance of the grid resistor must be decreased for dynamic braking to continue to function. Lowering the equivalent resistance of the grid resistors permits dynamic braking despite lower rotational velocity of the motors. Early dynamic braking systems begin shorting out portions of the grid resistor to lower its equivalent resistance. This would extend the range of locomotive speed over which dynamic braking was operable. The early dynamic braking systems present two problems.

First, these dynamic braking systems could not operate at slow locomotive speeds. Early braking systems could not shunt out the entire grid resistor without disconnecting the grid blower, a necessary component for dynamic braking, which is in the same circuit as the grid resistor. Typically, once the locomotive has reached speeds of 6 mph or slower, the locomotive must rely solely on its mechanical braking components, like pneumatic brakes, until the locomotive has completely stopped. The increased use of friction-based braking systems produces unnecessary wear on these parts and requires more frequent repairs of the braking system. Thus, to increase the working life of the locomotive's mechanical braking components, an extended range dynamic braking system may be required.

Second, early rheostatic braking systems are only capable of extended range dynamic braking, and cannot produce a continuously linear braking force. Extended-range dynamic braking shorts out portions of the grid resistor at a series of discrete points, such that lowering the equivalent resistance of the grid resistor is accomplished in a series of steps. In a legacy system, each step down causes locomotive handling problems for the operator. During a step-down of the grid resistor, the locomotive often lurches or lunges. The operator must be able to handle each of these difficulties to safely control the locomotive. A braking system capable of applying a continuously linear braking force is able to gradually decrease the equivalent resistance of the grid resistor, eliminating the locomotive handling problems associated with step-down dynamic braking. Thus, to increase locomotive safety, a continuously variable dynamic braking system may be required.

One solution for maintaining dynamic braking at low speeds is described in U.S. Patent Application Publication No. 2009/0295315 A1 ("the '315 publication"). The '315 publication is directed to a system that purportedly incorporates a dynamic braking system for a hybrid locomotive that works at low speeds.

The dynamic braking solution provided by the '315 publication is limited to traction motors in which the armature and the field winding of the traction motor are connected in series. This circuit requires additional control methods to overcome the instability resulting from the armature and field windings being connected in series. For example, these instabilities can create a positive feedback condition across the field coils, which will cause a runaway current build-up if not properly controlled. To implement rheostatic braking, the circuit of the '315 publication requires the current path through the DC bus to be completed by a grid resistor. In this system, connecting the grid resistor directly to the DC bus requires additional controls to prevent the grid resistor from unnecessarily dissipating power during normal motoring. Furthermore, the system cannot isolate the grid resistor in the event it malfunctions. While the '315 publication purportedly allows for dynamic braking at low speeds, the design makes the traction motor drive system unnecessarily vulnerable to current instability and grid resistor breakage.

The presently disclosed traction motor drive system is directed to overcoming one or more of the problems set forth above and/or other problems in the art.

SUMMARY OF THE INVENTION

In accordance with one aspect, the present disclosure is directed to a traction motor drive system. The traction motor drive system may include a field winding subsystem comprising a field winding associated with a traction motor. The traction motor drive system may also include an armature subsystem arranged in parallel with the field winding subsystem. The armature subsystem may include an armature having first and second armature terminals and a grid resistor selectively electrically coupled in series with the armature. The armature subsystem may also include an armature chopper arranged in parallel with the grid resistor and electrically coupled in series with the armature. The armature chopper may be configured, when the grid resistor is electrically coupled to the armature, to conditionally conduct current to the armature.

In accordance with another aspect, the present disclosure is directed to a method of controlling an armature chopper arranged in series with an armature and in parallel with a grid resistor to decrease the effective resistance of the grid resistor when the armature is generating current. The method may include monitoring a field current associated with a field winding, the field winding arranged in parallel with the grid resistor and the armature. The method may also include comparing the field current with a threshold value. When the field current exceeds the threshold value, the method may include calculating a duty cycle associated with the armature chopper and switching the armature chopper at the calculated duty cycle to selectively bypass the grid resistor during the portion of a period the armature chopper is on.

According to another aspect, the present disclosure is directed to a locomotive. The locomotive may include a plurality of axles and a plurality of pairs of wheels, each pair of wheels attached to one of the axles. The locomotive may also include a plurality of armatures arranged in parallel with one another, each having first and second armature terminals. Each armature may be rotatably coupled to one of the axles. The locomotive may also include a plurality of field windings arranged in series with one another, each field winding associated with a respective one of the armatures. The plurality of field windings may be arranged in parallel with the plurality of armatures. The locomotive may include a plurality of armature choppers. Each armature chopper may be electrically coupled to the first armature terminal of a respective one of the armatures. The locomotive may include a plurality of grid resistors. Each grid resistor may be arranged in parallel with a respective one of the armature choppers.

DETAILED DESCRIPTION

Figure 1:
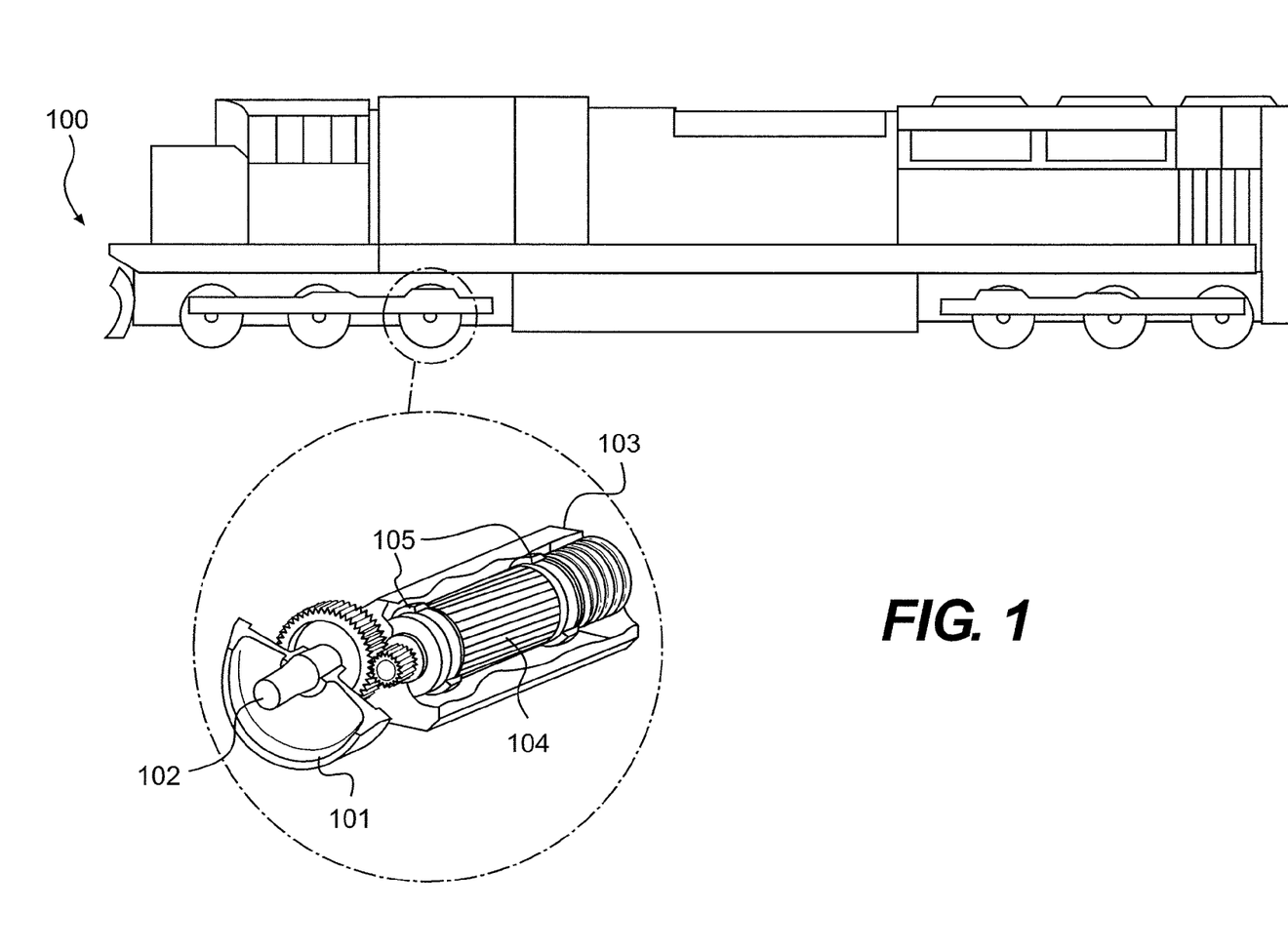
FIG. 1 illustrates an exemplary locomotive that comprises a traction motor.
Figure 2:
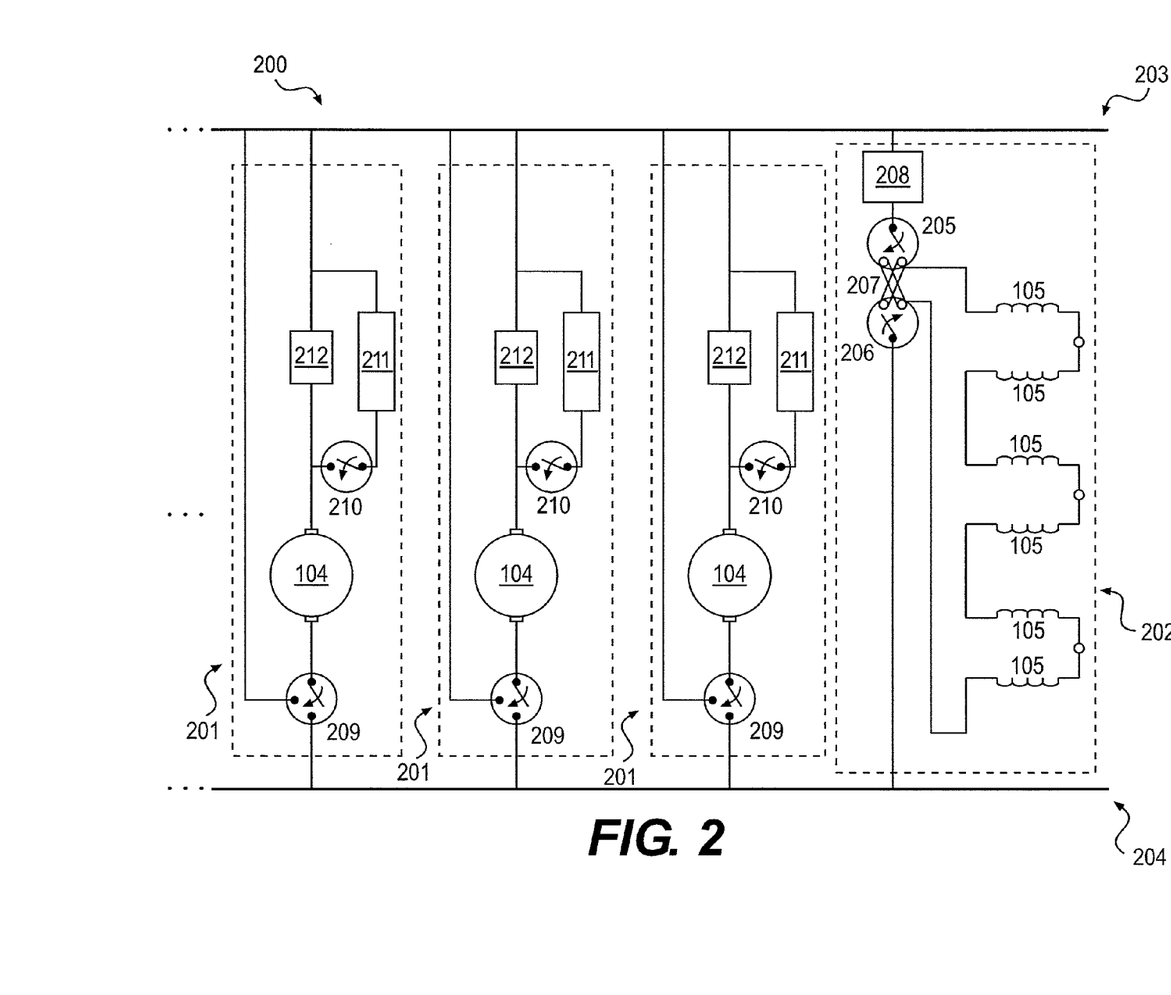
FIG. 2 provides a schematic of an exemplary traction motor drive system.

FIG. 1 illustrates an exemplary locomotive 100 in which systems and methods for dynamic braking may be implemented consistent with the disclosed embodiments. Locomotive 100 may be any electrically powered rail vehicle employing DC traction motors for propulsion. Furthermore, any electrically powered vehicle employing DC traction motors for propulsion could also incorporate the systems and methods for traction motor isolation consistent with the disclosed embodiments. According to the exemplary embodiment illustrated in FIG. 1, locomotive 100 may include six pairs of wheels 101, with each pair of wheels 101 attached to an axle 102 that is rotatably coupled to a traction motor 103. Traction motors 103 may each include an armature 104 and a field winding 105. As locomotive 100 uses a DC traction motor system, traction motor 103 may comprise separate circuits for armature 104 and field winding 105. FIG. 2 illustrates the relationship between armature 104 and field winding 105 within a traction motor drive system 200.

Traction motor drive system 200 includes a plurality of mechanical and electrical components that cooperate to propel locomotive 100. Traction motor drive system 200 may be divided into two distinct but cooperative subsystems, a plurality of armature subsystems 201 and a field winding subsystem 202. Armature subsystems 201 and field winding subsystem 202 are each connected to a positive voltage source 203 and a negative voltage source 204. As shown in FIG. 2, traction motor drive system 200 comprises a single field winding subsystem 202, which includes field windings 105 for each traction motor 103 of traction motor drive system 200. Traction motor drive system 200 comprises a separate armature subsystem 201 for each armature 104. In traction motor drive systems that comprise multiple traction motors 103, armature subsystems 201 are arranged in parallel with each other.

Figure 4:
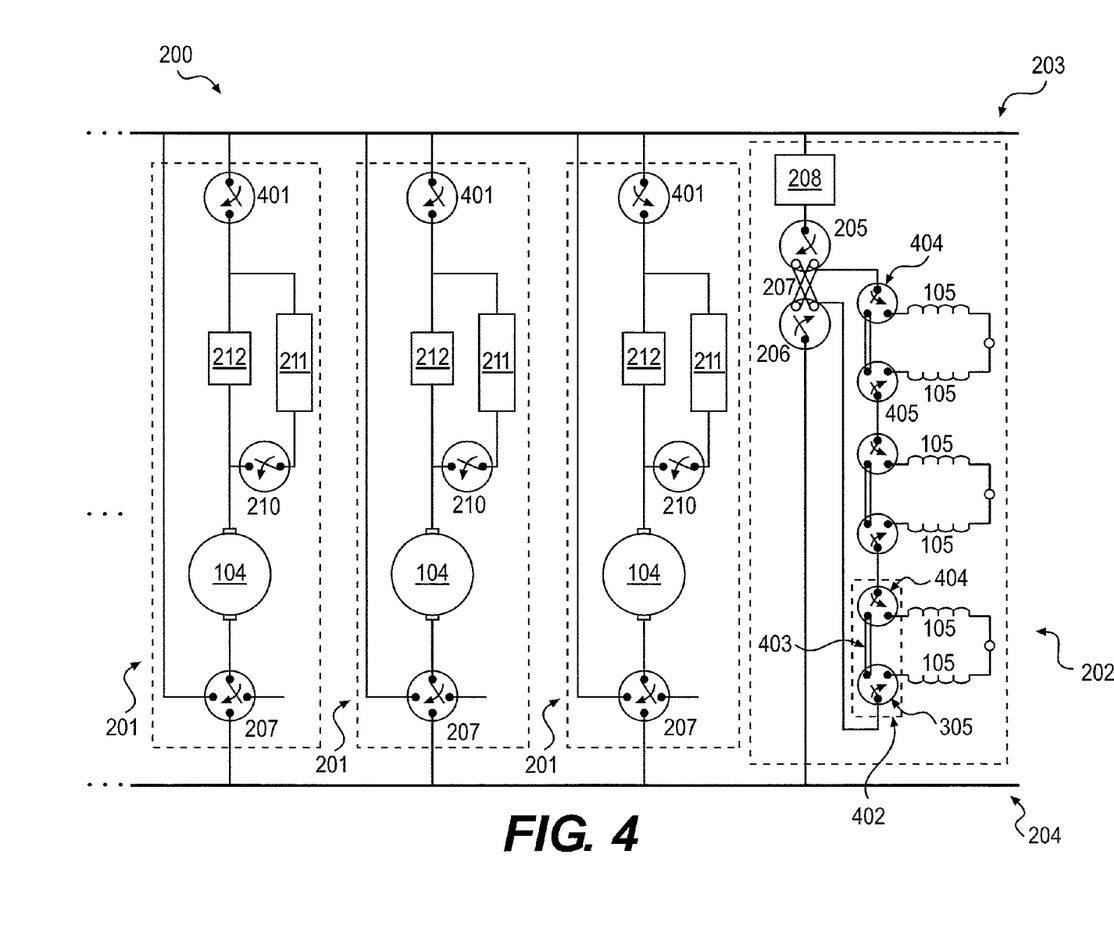
FIG. 4 provides a schematic of an exemplary traction motor drive system including circuitry capable of isolating malfunctioning components.

Field winding subsystem 202 may be connected in parallel with the plurality of armature subsystems 201. Within field winding subsystem 202, each field winding 105 may be connected in series with one another. In the exemplary embodiment, there are six armature subsystems 201, each corresponding to one of six traction motors 103. For clarity, FIGS. 2 and 4 show only three of the six armature subsystems 201. Three additional armature subsystems 201 may be connected in parallel to armature subsystems 201 shown in FIGS. 2 and 4. Of course, this embodiment may be altered to accommodate a different number of traction motors 103 by changing the number of armature subsystems 201 and the number of field windings 105 within field winding subsystem 202.

In addition to field windings 105, field winding subsystem 202 may also include components necessary to operate field windings 105 during normal operation. For example, field winding subsystem 202 may also include a pair of field polarity switches 205, 206, a reverser 207, and a field chopper 208. Field chopper 208 may be arranged in series with the plurality of field windings 105.

Field chopper 208 may embody a power-regulation device configured to regulate current through field windings 105. By controlling the current through field windings 105, field chopper 208 may be configured to regulate the torque of traction motors 103. By way of example, when locomotive 100 begins to pull a load, it is the nature of traction motors 103 to require high amounts of current at low generator voltage to provide the torque needed to initially move locomotive 100 and its load. As locomotive 100 accelerates, the requirement for current reduces while the applied voltage increases. Field chopper 208 responds to this demand.

By manipulating the direction of current flow through field windings 105 using field polarity switches 205, 206 and reverser 207, traction motor drive system 200 can control the direction of rotation of traction motors 103, allowing locomotive 100 to travel in both the forward and reverse directions. This ability to change the direction of current flow through field windings 105 may also be used during dynamic braking.

Reverser 207 is configured to act as a connection point to the series of field windings 105. Field polarity switches 205, 206 are configured to switch between the different connection points of reverser 207. First field polarity switch 205 may be connected to field chopper 208 and second field polarity switch 206 may be connected to negative voltage source 204. Field polarity switches 205, 206 may be configured to change the polarity of field windings 105.

Reverser 207 may connect to the series of field windings 105. Reverser 207 has four leads. The first pair of leads connects directly to the series of field windings 105. The second pair of leads is a set of connection points that field polarity switches 205, 206 can engage. When the directions of field polarity switches 205, 206 are switched, the switches connect to different leads of reverser 207, which effectively reconfigures field winding subsystem 202, reversing the direction of current flow through field winding subsystem 202 and its field windings 105.

Field polarity switches 205, 206 of the exemplary embodiment may be single-pole, double-throw switches, although field polarity switches 205, 206 may comprise any combination of components capable of switching the direction current flow through field windings 105. In a first position, field polarity switches 205, 206 connect directly to the first pair of connection points of reverser 207. In this mode, field polarity switches 205, 206 allow current to flow directly through the series of field windings 105. In a second position, field polarity switches 205, 206 connect to the second pair of connection points of reverser 207. In this mode, the current must flow through reverser 207 before flowing through field windings 105 in the opposite direction that it flows when field polarity switches 205, 206 are in the first position.

As shown in FIG. 2, each armature subsystem 201 may include armature 104, a motor-brake switch 209, and other components for facilitating dynamic braking. Armature subsystem 201 may include the components to operate armature 104 during both powering mode and braking mode. Each of the plurality of armatures 104 comprises a first armature terminal and a second armature terminal. The first armature terminal may be coupled to positive voltage source 203. The second armature terminal is coupled to motor-brake switch

209, which may switch between powering mode and braking mode. The first terminal of armature 104 may connect to positive voltage source 203 through the dynamic braking components.

Motor-brake switch 209 can switch the configuration of armature 104 to change between powering mode and braking mode. In one embodiment, motor-brake switch 209 may be a single-pole, double-throw switch connected to the second terminal of armature 104. During normal powering mode, motor-brake switch 209 may connect the second terminal of armature 104 to negative voltage source 204. During braking mode, motor-brake switch may connect the second terminal of armature 104 to positive voltage source 203.

A brake contactor 210 may cooperate with motor-brake switch 209 to switch traction motor drive system 200 from powering to braking. Brake contactor 210 may electrically connect a grid resistor 211 to traction motor drive system 200. Traction motor drive system 200 may include a plurality of brake contactors 210, each connected between a respective armature 104 and a respective grid resistor 211. During powering mode, brake contactor 210 remains open, electrically isolating grid resistor 211 from armature 104. During braking mode, brake contactor 210 closes, providing an electrical connection between armature 104 and grid resistor 211 to allow grid resistor 211 to dissipate the excess power produced during dynamic braking. Brake contactor 210 may be any switch or contactor capable of performing this function. In one exemplary embodiment, brake contactor 210 is a single-pole, single-throw switch. Brake contactor 210 may be controlled manually by an operator command, or it can change automatically when motor-brake switch 209 is moved into a braking mode.

When motor-brake switch 209 and brake contactor 210 are switched into braking mode, traction motor drive system 200 may be configured act as a "dynamic brake" for locomotive 100. Dynamic braking is an electrically-assisted braking method that slows locomotive 100 during normal road operation and when descending steep mountain grades. During dynamic braking, the position of motor-brake switch 209 configures traction motors 103 to act as generators. The momentum of locomotive 100 provides the mechanical energy for rotating armatures 104 relative to field windings 105, thereby converting the kinetic energy associated with the momentum of locomotive 100 into electrical energy. As will be explained in greater detail below, the electrical energy can be quickly dissipated by grid resistors 211. The resistance provided by grid resistors 211 increases the mechanical drag on armature 104, causing wheels 101 of locomotive 100 (which are connected to armature 104) to turn more slowly.

As explained, traction motor drive system 200 may include components for dissipating this generated electrical energy. These components may include grid resistors 211 and an armature chopper 212. Grid resistors 211 dissipate generated power during rheostatic dynamic braking as heat. Grid resistors 211 may be fixed resistors. In one embodiment, the resistance of grid resistors 211 may be around 0.632 Ohms. As shown in FIG. 2, traction motor drive system 200 may include a plurality of grid resistors 211, each arranged in series with a respective one of the armatures 104. Grid resistor 211 may be arranged in parallel with an armature chopper 212.

Armature chopper 212 is electrically connected to the first armature terminal of an associated armature 104. In normal powering mode, armature chopper 212 regulates the current through armature 104 relative to the current through field windings 105. During dynamic braking, armature chopper 212 can be selectively operated to regulate the equivalent resistance of the grid resistor 211 to provide a continuously variable resistance value for increasing the effective speed range for dynamic braking.

Armature chopper 212 may be any switched DC current regulation device. For example, armature chopper 212 may comprise a DC-DC chopper capable of handling the power requirements of traction motor drive system 200. In one embodiment, armature chopper 212 may use one or more gate turn-off ("GTO") thyristors. Alternatively, armature chopper 212 may use transistors to control the current flow through grid resistors 211.

By changing its duty cycle, armature chopper 212 can vary the equivalent resistance of grid resistor 211. When armature chopper 212 is "on," it is conducting, so that current is shunted around grid resistor 211. Alternatively, when armature chopper 212 is "off," it operates as an open circuit and current may flow through grid resistor 211. By way of example, when armature chopper 212 operates at 100% duty cycle during dynamic braking, the effective resistance of grid resistor 211 would be negligible. Alternatively, if armature chopper 212 operates at 0% duty cycle during dynamic braking, the effective resistance of grid resistor 211 would be the actual resistance of grid resistor 211. Armature chopper 212, therefore, may vary the effective resistance of grid resistor 211 by changing its duty cycle between 0% and 100%, depending upon a desired effective resistance. By providing an electrically controllable mechanism, armature chopper 212 can be used to electronically decrease the effective resistance of grid resistor 211, allowing a more gradual decrease of braking force produced by armatures 104 as locomotive 100 slows. This electronic control capability may provide a smooth, linearly extended range operation of dynamic braking to a lower locomotive speed than would be obtainable through traditional systems that simply switch between different fixed resistance values.

Armature choppers 212 may be separately controllable, so that the equivalent resistance of each grid resistor 211 can be individually changed. In one embodiment, this may be used for wheel slip correction. This may provide opportunities for multivariable control for low speed, part-brake handle operation, in addition to wheel slipping conditions. The armature choppers 212 may be used to reduce the braking effort on one or more axles by reducing the armature chopper 211 current, thereby increasing the equivalent resistance of a single path and reducing the armature 104 current, and correcting the slip.

Figure 3:
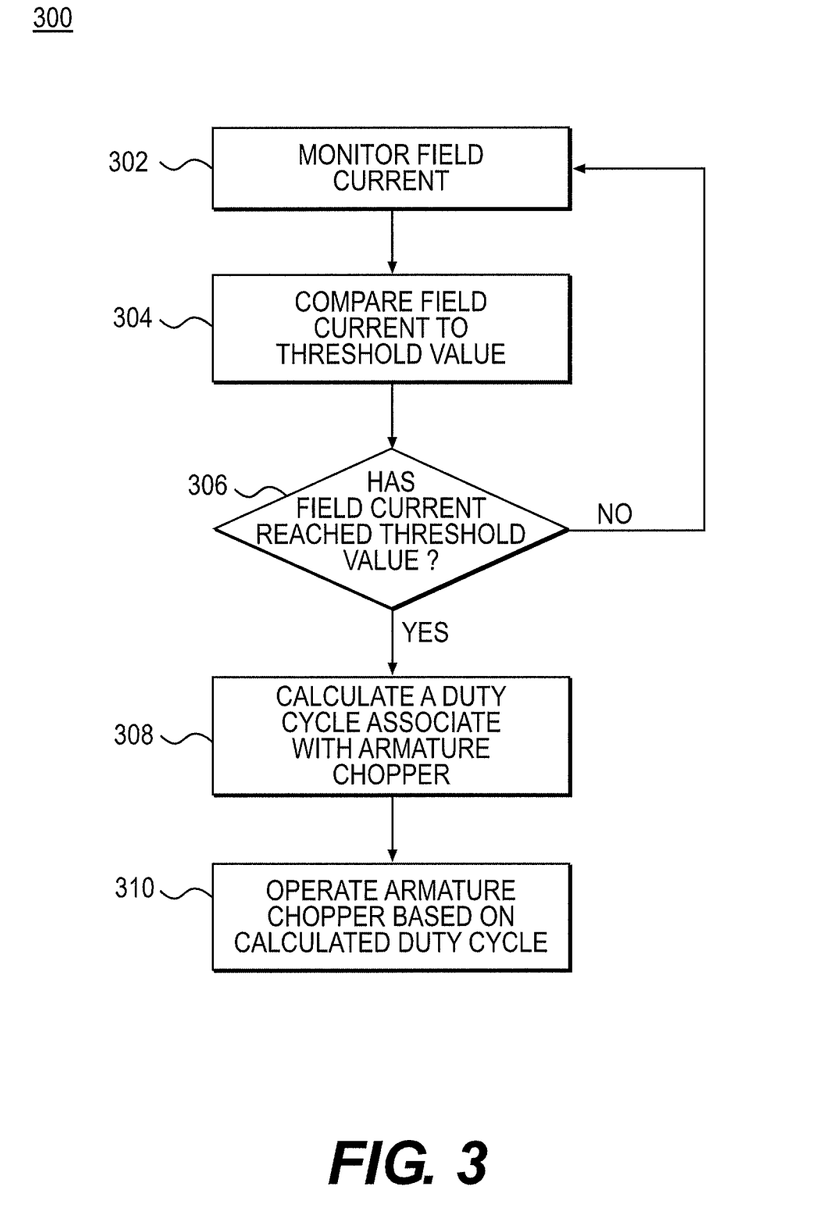
FIG. 3 provides a flowchart depicting an exemplary method of controlling an armature chopper.

FIG. 3 provides a flowchart 300 illustrating a method of controlling armature chopper 212 to decrease the effective resistance of grid resistor 211. Armature chopper 212 may be a switched DC current regulation device arranged in parallel with grid resistor 211 and in series with armature 104. Armature chopper 212 may be arranged in series with armature 104 and in parallel with grid resistor 211.

The method may include monitoring a field current associated with field winding 105 (Step 302). Field winding 105 may be arranged in parallel with the series combination of grid resistor 211 and armature 104. For dynamic braking, as locomotive 100 slows down, field chopper 208 may increase the field current associated with and travelling through field winding 105 so that armature 104 can continue to generate current. In one embodiment, field winding subsystem 202 may include a current sensor positioned on one or more of the field windings and may be configured to monitor the field current passing through there. In another embodiment, other types of electrical sensors may be used, such as a voltage sensor, to calculate the field current.

The method may also include comparing the field current with a threshold value (Step 304). In one embodiment, the threshold value may relate to the current rating of field windings 105. In another embodiment, the threshold value of the field current may depend on the characteristics of field chopper 208. If the field current has not reached the threshold value (Step 306: No), the method may revert back to step 302 and continue monitoring field current.

As locomotive 100 continues to slow and the field current through field winding 105 reaches a threshold value, increasing the field current above the current rating of the field windings is not a viable option for ensuring linear and continuously-variable control of dynamic braking at low machine speeds. Thus, when current through the field winding reaches the threshold value (Step 306: Yes), traction motor drive system 200 may selectively operate armature chopper 212 to decrease the equivalent resistance of grid resistor 211 for continued control of dynamic braking at low speed.

If the field current has reached a threshold value (Step 306: Yes), the method may include calculating a duty cycle associated with armature chopper 212 (Step 308). The effective resistance of grid resistor 211 can be decreased by increasing the duty cycle of armature chopper 212. According to one embodiment, the duty cycle of armature chopper 212 may be inversely related to the current generated by armature chopper 212 and to the effective resistance of grid resistor 211.

It is contemplated that the duty cycle of the chopper may be varied based on a variety of different parameters. In one embodiment, the duty cycle may change as a function of the current generated by armature 104. That is, armature chopper 212 may be configured to conduct current based on the rotational velocity of armature 104. The duty cycle may also depend on the current measured at armature chopper 212. The duty cycle may also be a function of the rotational velocity of armature 104. In one embodiment, armature chopper 212 may be configured to conduct current based on the rotational velocity of armature 104. To gradually decrease the braking effects of armature 104, the calculated duty cycle of armature chopper 212 will gradually be increased. In one embodiment, the duty cycle may linearly increase as a function of time.

Other methods of controlling dynamic braking are known by those having ordinary skill in the art. For example, dynamic braking controls may depend on the grid current, in which the algorithm associates the operator's brake handle position with the current flow through grid resistor 211. In another embodiment, dynamic braking controls may depend on the field current, in which the brake handle regulates the current through field windings 105. In yet another embodiment, dynamic braking controls may depend on the brake effort, in which the brake effort, or dynamic braking power, is related to the brake handle position.

The method may also include operating armature chopper 212 at the calculated duty cycle to selectively bypass grid resistor 211 during the operating portion of the calculated duty cycle when the field current exceeds the threshold value (Step 310). Armature chopper 212 may be a switched DC current regulation device that may be operated at a variable duty cycle. When armature chopper 212 is "on" grid resistor 211 is effectively shorted out of the circuit causing the current to bypass grid resistor 211. When armature chopper 212 is "off," no current is allowed to bypass grid resistor 211, causing any current that armature 104 generates to travel through grid resistor 211. In one embodiment, the method may also include operating armature chopper 212 at 0% duty cycle—that is, operating as an open circuit—until the field current reaches the threshold value.

According to one exemplary embodiment, the presently disclosed systems and methods for continuously varying the dynamic braking capability at low locomotive speeds may be implemented with the ability to isolate traction motor components. As such, should one or more grid resistors 211 fail during operation of traction motor drive system 200, the corresponding armature subsystem 201 may be isolated from the system. The remaining armature subsystems 201 can then be operated to compensate for the loss of braking capacity associated with the isolated armature subsystem 201. Thus, by providing a method for electronically controlling the effective resistance of the grid resistors 211 by modifying the duty cycle of the armature choppers 212, the systems and methods described herein can be easily modified in real-time to maintain the dynamic braking control capabilities of traction motor drive system 200, in real-time, as locomotive 100 conditions require.

FIG. 4 shows one application of dynamic braking with a traction motor drive system capable of isolating both armature subsystems 201 and field windings 105. Traction motor drive system 200 may be implemented with one of the isolation capabilities. For example, traction motor drive system 200 may include field winding isolation capabilities without necessarily requiring an armature isolation system. Alternatively, traction motor drive system 200 may be provided with armature isolation capabilities and without the field isolation capabilities. Thus, the system need not be limited to the specific embodiment of FIG. 4 but may have different configurations of the components described. Each type of isolation capability is discussed in turn.

Traction motor drive system 200 may be capable of isolating at least one armature subsystem 201 in which one or more components is malfunctioning. To isolate armature subsystem 201, the subsystem may be electrically disconnected from the remainder of traction motor drive system 200. Armature isolation may be realized by the selective operation of a power switch 401 and motor-brake switch 209 connected to armature 104.

For traction motor isolation, motor-brake switch 209 may be a single-pole, triple-throw switch that is able to isolate armature 104 from the remainder of traction motor drive system 200 in the event of an electrical failure affecting all or part of armature subsystem 201. According to an exemplary embodiment of FIG. 4, motor-brake switch 209 may have at least three modes of operation: a powering mode, a braking mode, and an isolation mode. During the powering mode, motor-brake switch 209 connects the second terminal of armature 104 to negative voltage source 204. In the second position, motor-brake switch 209 may electrically couple the second armature terminal to positive voltage source 203 to shift armature 104 into braking mode. To isolate armature subsystem 201, motor-brake switch 209 shifts into a third mode that electrically disconnects the second terminal of armature 104 from any power source. This, in cooperation with the operation of power switch 401, electrically isolates armature 104 from the remainder of traction motor drive system 200.

In one embodiment, motor-brake switch 209 may be configured to isolate armature 104 automatically in the event of an electrical failure affecting all or part of armature subsystem 201. In another embodiment, motor-brake switch 209 may be configured to isolate armature 104 only after receiving a command from an operator or another system of locomotive 100 to isolate armature 104. There are a variety of other switches and contactors known in the art that are capable of disconnecting armature 104 that are equally suitable to operate as motor-brake switch 209 of the traction motor drive system 200. Motor-brake switch 209 may include or embody any of these types of components.

Power switch 401 may be a single-pole, single-throw switch that is able to isolate armature subsystem 201 from the remainder of the traction motor drive system 200 by disconnecting the armature subsystem 201 from positive voltage source 203. In one embodiment, power switch 401 may operate to isolate armature 104 automatically in the event of an electrical failure affecting all or part of armature subsystem 201. Alternatively, power switch 401 could operate to isolate armature 104 only after receiving a command from an operator or another system of the locomotive 100 to isolate armature 104. There are a variety of other switches and contactors known in the art that are capable of disconnecting armature 104 that are equally suitable for operating as power switch 401 of traction motor drive system 200. Power switch 401 may include or embody any of these types of components.

In the exemplary circuit of FIG. 4, motor-brake switch 209 and power switch 401 are configured to isolate armature subsystem 201, including armature 104, grid resistor 211, and armature chopper 212, from the remainder of traction motor drive system 200. In another embodiment, motor-brake switch 209 could be a single-pole, double-throw switch capable only of switching between braking mode and powering mode. In this configuration, to achieve armature isolation, a dedicated isolation switch (not shown) could be incorporated to achieve the same result.

While not shown in FIG. 4, alternative configurations of traction motor drive system 200 may include fewer power switches 401 and motor-brake switches 209, such that each power switch 401 and motor-brake switch 209 controls the current flow to multiple armature subsystems 201. It is not necessary that each armature subsystem 201 have a devoted power switch 401 and motor-brake switch 209. For example, pairs of armature subsystems 201 could share a common power switch 401 and a common motor-brake switch 209. Other configurations of armature isolation components can be contemplated by one with ordinary skill in the art.

In addition to armature isolation, traction motor drive system 200 may be configured to isolate defective or malfunctioning field windings 105 using a field isolation system 402 associated with field winding subsystem 202. Field isolation system 402 comprises a shunt circuit 403, a first field switch 404, and a second field switch 405. Traction motor drive system 200 may include a plurality of field isolation systems 402, each field isolation system 402 associated with a respective one of the field windings 105. Alternatively, each field isolation system 402 may be associated with a plurality of field windings 105. In FIG. 4, traction motor drive system 200 contains three field isolation systems 402, each corresponding with a pair of field windings 105.

Within field winding subsystem 202, field windings 105 are connected in series with first field switch 404 and second field switch 405, which can remove defective field winding 105 from traction motor drive system 200. By shunting defective field winding 105, the remaining field windings 105 of traction motor drive system 200 continue to receive power and operate normally. The embodiment illustrated in FIG. 4 allows traction motor drive system 200 to achieve ⅔ of normal tractive or braking effort despite a malfunctioning field winding 105. To isolate a pair of field windings 105, first field switch 404 connects to the first end of shunt circuit 403, and second field switch 405 connects to the second end of shunt circuit 403. In this configuration, field windings 105 are shunted, such that the current continues to flow through the remainder of field winding subsystem 202. In another embodiment, a field winding subsystem 202 could equally be applied to each of the six representative field windings 105, providing the ability to isolate any single defective circuit, while preserving the functionality of the remaining 5, providing ⅚ of the normal electrical braking effort.

Field switches 404, 405 can be any electromechanical component capable of isolating field winding 105 from the remainder of traction motor drive system 200 in the event of an electrical failure affecting all or part of field winding 105. In one embodiment, field switches 404, 405 may be single-pole, double-throw switches. There are a variety of other switches and contactors known in the art that are capable of isolating field winding 105 from the remainder of traction motor drive system 200. Field switches 404, 405 may include or embody any of these types of components.

The operation of field switches 404, 405 may be automatic or manual. In one embodiment, field switches 404, 405 could operate to shunt one or more of the field windings 105 automatically in the event of an electrical failure affecting all or part of a malfunctioning field winding 105. Alternatively, field switches 404, 405 could operate to shunt field winding 105 only after receiving a command from an operator to isolate field winding 105 from the remainder of traction motor drive system 200. In yet another embodiment, the operation of field switches 404, 405 could result from a combination of automatic or manual inputs. For example, first field switch 404 may operate to shunt field winding 105 only after receiving a command to do so, and second field switch 405 may operate automatically once first field switch 404 becomes engaged.

It should be emphasized that power switch 401 and motor-brake switch 209, as well as first and second field switches 404, 405, can be separately controlled such that isolation of armature subsystem 201 does not require isolation of field winding 105. Likewise, isolation of field winding 105 does not require isolation of armature subsystem 201.

It is contemplated that locomotive 100 may include additional components for communication between an operator and traction motor drive system 200, such as a controller. In one embodiment, the controller may be a processor capable of receiving inputs from sensors to detect electrical failures. The controller may also be configured to notify the operator of the occurrence of an electrical fault and may allow the operator to send control signals to isolate the affected components. Locomotive 100 may include an operator interface that provides the operator a way to receive fault notifications and send commands to the controller. For example, the operator interface may include a processor for receiving notifications from the controller and an output screen for displaying these notifications to the operator. The operator interface may also include an operator input system, such as a series of buttons, for the operator to send commands to the controller to selectively isolate electrical components.

Additionally or alternatively, locomotive 100 may include a braking controller. This braking controller may monitor the operability of dynamic braking and a second form of braking, such as pneumatic braking. The braking controller may be able to turn on and off the different braking systems of locomotive 100.

Once the conduction current of armature choppers 212 has reached its maximum, additional braking systems may be necessary. To account for this, the controller may send a communication signal to a braking controller to engage a secondary braking system, such as a pneumatic braking system.

INDUSTRIAL APPLICABILITY

The disclosed systems and methods for dynamic braking described herein provide a robust solution for enhancing the performance of traction motor drive systems by allowing smooth, linear, extended-range operation of dynamic braking. By enabling dynamic braking at lower locomotive speeds, the systems and methods described herein further reduce the reliance on friction-based braking components at these low locomotive speeds. As a result, service costs associated with repair and replacement of wear components (e.g., brake pads, brake rotors) may be significantly reduced. Furthermore, damage associated with wheel heating (due to braking friction) may be dramatically reduced.

The presently disclosed traction motor drive system may have several advantages. Specifically, the presently disclosed dynamic braking system operates at much lower locomotive speeds than traditional dynamic braking systems. In blending braking systems, the more a locomotive can rely on dynamic brakes rather than air brakes, the less frequently the mechanical braking parts require maintenance and replacement. Extending the time between scheduled maintenance maximizes the amount of time locomotives are in service.

Additionally, the traction motor drive system replaces conventional stepped resistors with a switched DC current regulation device, so that the dynamic braking system applies braking force to the locomotive linearly, rather than in a step-down method of conventional dynamic braking systems. As a result, locomotive handling becomes easier because the locomotive does not experience the lunging associated with step-down dynamic braking.

Furthermore, the disclosed dynamic braking solution works for traction motor drive systems in which the armature and field windings are connected in parallel. This increases the stability of the traction motor drive system and allows electrical isolation of grid resistors when not in use.

It will be apparent to those skilled in the art that various modifications and variations can be made to the disclosed systems and associated. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A traction motor drive system, comprising:
    a field winding subsystem comprising a field winding associated with a traction motor; and
    an armature subsystem, arranged in parallel with the field winding subsystem and comprising:
        an armature comprising first and second armature terminals;
        a grid resistor selectively electrically coupled in series with the armature; and
        an armature chopper, arranged in parallel with the grid resistor and electrically coupled in series with the armature and configured, when the grid resistor is electrically coupled to the armature, to conditionally conduct current to the armature.

2. The system of claim 1, wherein the armature chopper is configured to conduct current based on the rotational velocity of the armature.

3. The system of claim 1, wherein the armature chopper is configured to conduct current based on the current generated by the armature.

4. The system of claim 1, wherein the at least one armature chopper comprises a switched DC current regulation device.

5. The system of claim 4, wherein the at least one armature chopper comprises a DC-DC chopper.

6. The system of claim 1, further including a motor-brake switch coupled to the second armature terminal of the at least one armature, the motor-brake switch comprising at least first and second switch positions, the first switch position configured to electrically couple the second armature terminal to a negative voltage source and the second switch position configured to couple the second armature terminal to a positive voltage source.

7. A traction motor drive system, comprising:
    a field winding subsystem comprising a field winding associated with a traction motor; and
    an armature subsystem, arranged in parallel with the field winding subsystem and comprising:
        an armature comprising first and second armature terminals;
        a grid resistor selectively electrically coupled in series with the armature;
        an armature chopper, arranged in parallel with the grid resistor and electrically coupled in series with the armature and configured, when the grid resistor is electrically coupled to the armature, to conditionally conduct current to the armature;
        a motor-brake switch coupled to the second armature terminal of the armature, the motor-brake switch comprising at least first and second switch positions, the first switch position configured to electrically couple the second armature terminal to a negative voltage source and the second switch position configured to couple the second armature terminal to a positive voltage source; and
    a power switch configured to selectively connect the first armature terminal of a respective one of the armatures to the positive voltage source.

8. The system of claim 7, wherein the motor-brake switch comprises a third switch position configured to electrically disconnect the second armature terminal of the armature.

* * * * *